US010127837B2

(12) United States Patent
Cragg et al.

(10) Patent No.: US 10,127,837 B2
(45) Date of Patent: Nov. 13, 2018

(54) CENTRAL VENOUS ACCESS TRAINER (CVAT)

(71) Applicant: Edison Nation Medical, LLC, Charlotte, NC (US)

(72) Inventors: Laura L. Cragg, Indian Trail, NC (US); Dawn Marie Swiderski, Charlotte, NC (US); Scott Wilson, Matthews, NC (US); Kenneth C. Paulus, Charlotte, NC (US); Christopher Hutchison, Goldston, NC (US)

(73) Assignee: Charlotte-Mecklenburg Hospital Authority, Charlotte, NC (US)

( * ) Notice: Subject to any disclaimer, the term of this patent is extended or adjusted under 35 U.S.C. 154(b) by 194 days.

(21) Appl. No.: 15/154,494

(22) Filed: May 13, 2016

(65) Prior Publication Data

US 2016/0335922 A1    Nov. 17, 2016

Related U.S. Application Data

(60) Provisional application No. 62/160,631, filed on May 13, 2015.

(51) Int. Cl.
    *G09B 23/28* (2006.01)
(52) U.S. Cl.
    CPC .................. *G09B 23/285* (2013.01)
(58) Field of Classification Search
    USPC ................ 434/262, 267, 268, 272
    See application file for complete search history.

(56) References Cited

U.S. PATENT DOCUMENTS

| | | | | | |
|---|---|---|---|---|---|
| 5,112,228 | A | * | 5/1992 | Zouras | G09B 23/285 434/267 |
| 8,439,687 | B1 | * | 5/2013 | Morriss | G09B 23/285 434/267 |
| 8,556,635 | B2 | * | 10/2013 | Toly | G09B 23/30 434/262 |
| 8,808,004 | B2 | * | 8/2014 | Misawa | G09B 23/285 434/268 |
| 9,852,660 | B1 | * | 12/2017 | Fairbanks | G09B 23/34 |
| 2001/0055748 | A1 | * | 12/2001 | Bailey | G09B 23/285 434/262 |
| 2015/0294599 | A1 | * | 10/2015 | Nitsche | A61B 8/0841 434/262 |

* cited by examiner

*Primary Examiner* — Kurt Fernstrom
(74) *Attorney, Agent, or Firm* — Blake E. Vande Garde; Erickson Kernell IP, LLC (57) ABSTRACT

A training device for the preparation, execution and maintenance of central venous catheters comprising a central block including a cavern traversing through the block, a tube running through the cavern, a reservoir containing a liquid with a distal end of the tube engaged with the reservoir, a covering material secured over the central block, a guidewire extended through the covering material and within the tube, a hydraulic or pneumatic device operationally associated with the reservoir and allowing the reservoir and the tube to be filled and pressurized with the liquid, a scalpel or similar instrument for making a small incision in the covering material at the site where the guide wire extends through the covering material, a dilator to expand the incision opening and then remove from the incision and guidewire and a catheter to feed over the guidewire and into the incision.

17 Claims, 12 Drawing Sheets

CENTRAL VENOUS ACCESS TRAINER (CVAT)

RELATED CASES

This application claims the priority of the provisional application Ser. No. 62/160,631 filed May 13, 2015. Applicant hereby incorporates by reference the entire content of provisional application Ser. No. 62/160,631.

FIELD OF INVENTION

The instant invention relates to medical devices which permit an individual the opportunity to practice Central Venous Catheterization.

BACKGROUND OF THE INVENTION

Central Venous Catheterization is a common procedure which is performed daily on patients throughout the world. A Central Venous Catheter (CVC), also known as a central line, central venous line, or central venous access catheter, is a catheter placed into a large vein. Catheters can be placed in veins in the: neck (internal jugular vein), chest (subclavian vein or axillary vein), groin (femoral vein), or through veins in the arms (also known as a PICC line, or peripherally inserted central catheters). A CVC is used to administer medication or fluids that are unable to be taken by mouth or would harm a smaller peripheral vein, obtain blood tests (specifically the "central venous oxygen saturation"), and measure central venous pressure.

Central venous catheters usually remain in place for a longer period than other venous access devices, especially when the reason for their use is longstanding (such as total parenteral nutrition in a chronically ill person). For such indications, a Hickman line, a PICC line, or a Port-a-Cath may be considered because of their smaller infection risk. Sterile technique is highly important here, as a line may serve as an entry point for pathogenic organisms. Additionally, the line itself may become infected with bacteria such as *Staphylococcus aureus* and coagulase-negative *Staphylococci*.

Training medical professionals on how to properly prepare, place, secure and maintain a CVC is critical. The risks associated with central line placement include infection, hematoma, collapsed lung and damage to veins and arteries. There are anatomical models available to allow medical professionals the opportunity to practice part of the Central Venous Catheterization procedure. While manufacturers advertise that entire procedure can be performed on their central line trainers, we have found that the steps of nicking, dilating, and inserting the central line dramatically decreases the lifespan of the product and makes an already expensive trainer even more costly due to an increased tissue set replacement cycle. However, omitting these steps can lead to an incomplete skill set for the learner. Additionally, expensive anatomical training devices do not allow for the training of individuals in flushing with saline, care and maintenance.

Thus, there is clearly a need for a device which allows for thorough, yet inexpensive training in all aspects of the Central Venous Catheterization preparation, execution and maintenance. The instant invention is designed to provide such each of these elements.

SUMMARY OF THE INVENTION

A training device for the preparation, execution and maintenance of central venous catheters comprising a central block including a cavern traversing through the block, a tube running through the cavern, a reservoir containing a liquid with a distal end of the tube engaged with the reservoir, a covering material secured over the central block, a guidewire extended through the covering material and within the tube, a hydraulic or pneumatic device operationally associated with the reservoir and allowing the reservoir and the tube to be filled and pressurized with the liquid, a scalpel or similar instrument for making a small incision in the covering material at the site where the guide wire extends through the covering material, a dilator to expand the incision opening and then remove from the incision and guidewire and a catheter to feed over the guidewire and into the incision.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
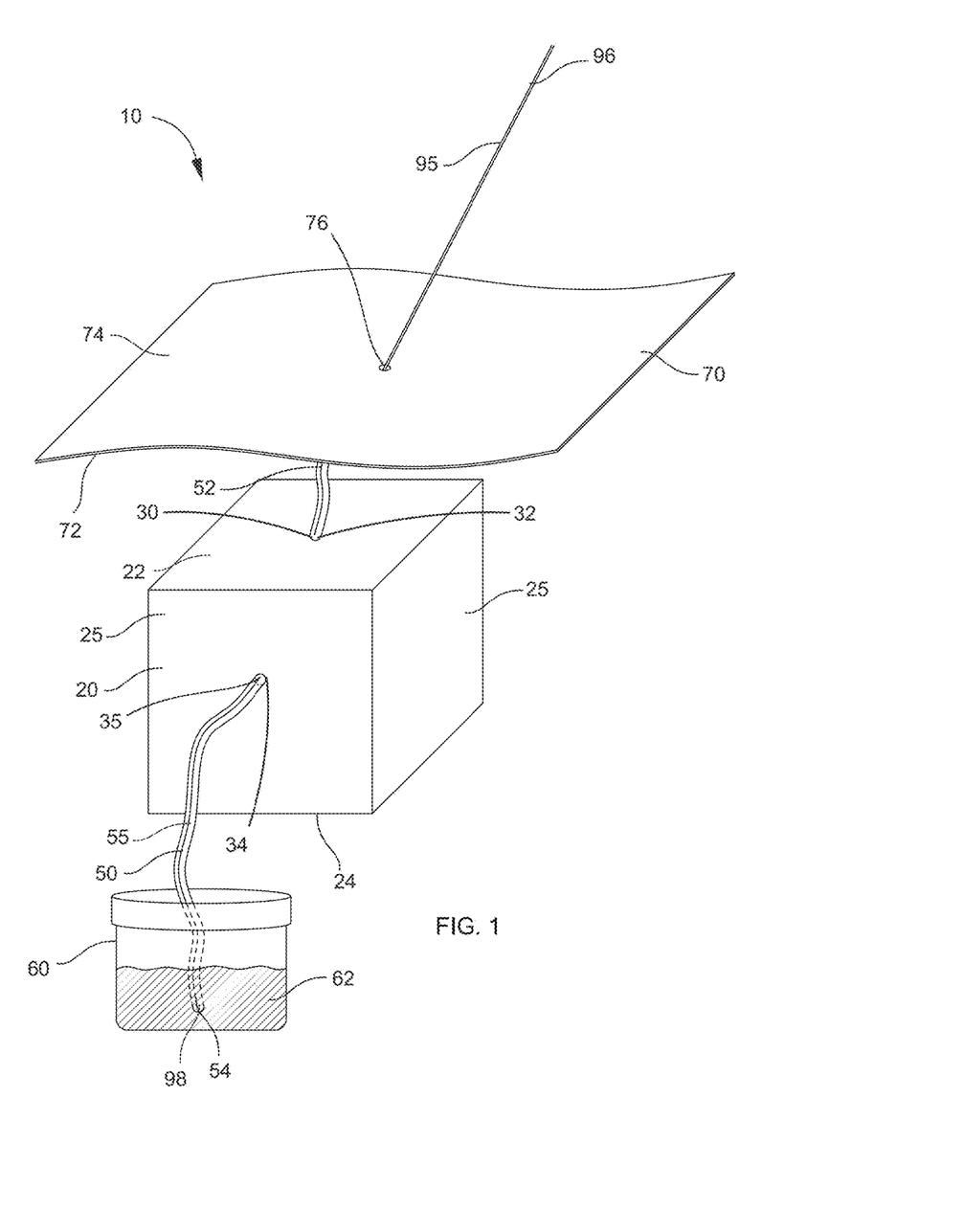
FIG. 1 is a perspective view of one embodiment of the instant invention.
Figure 2:
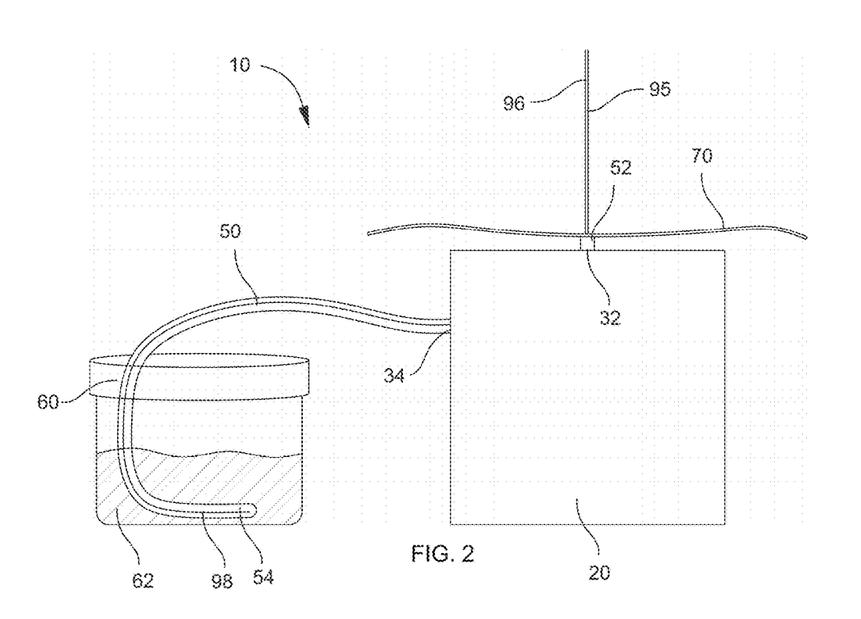
FIG. 2 is a side view of one embodiment of the instant invention.
Figure 3:
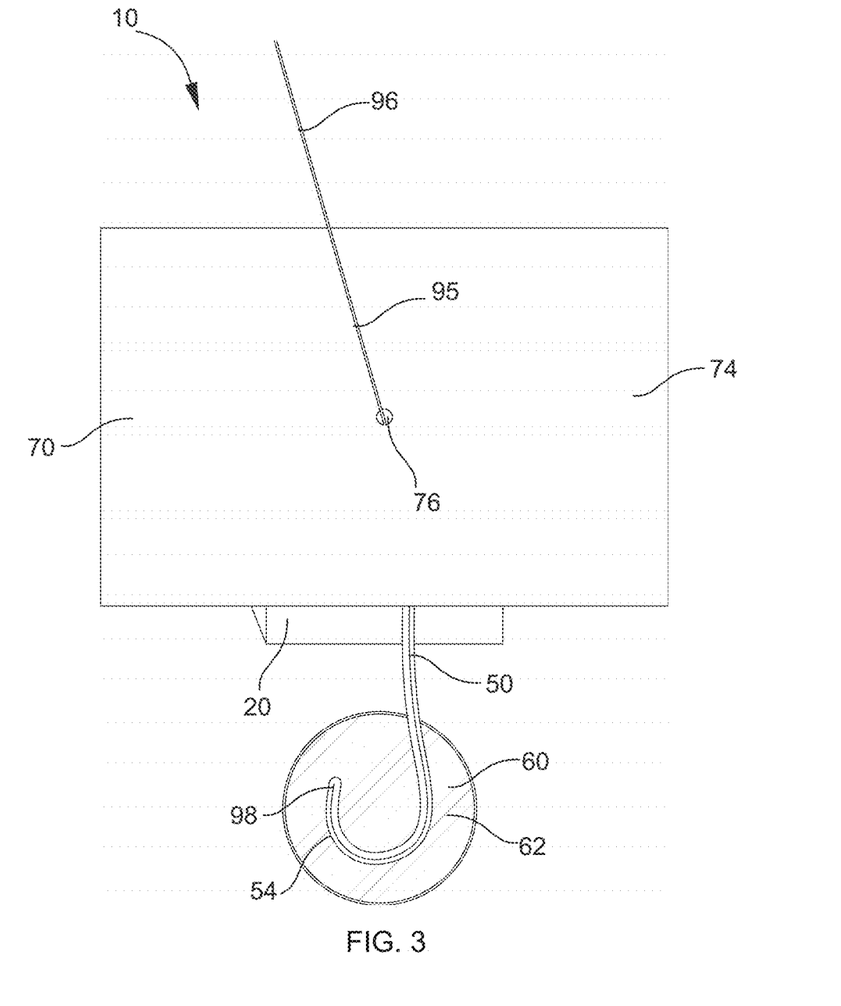
FIG. 3 is a top view of one embodiment of the instant invention.
Figure 4:
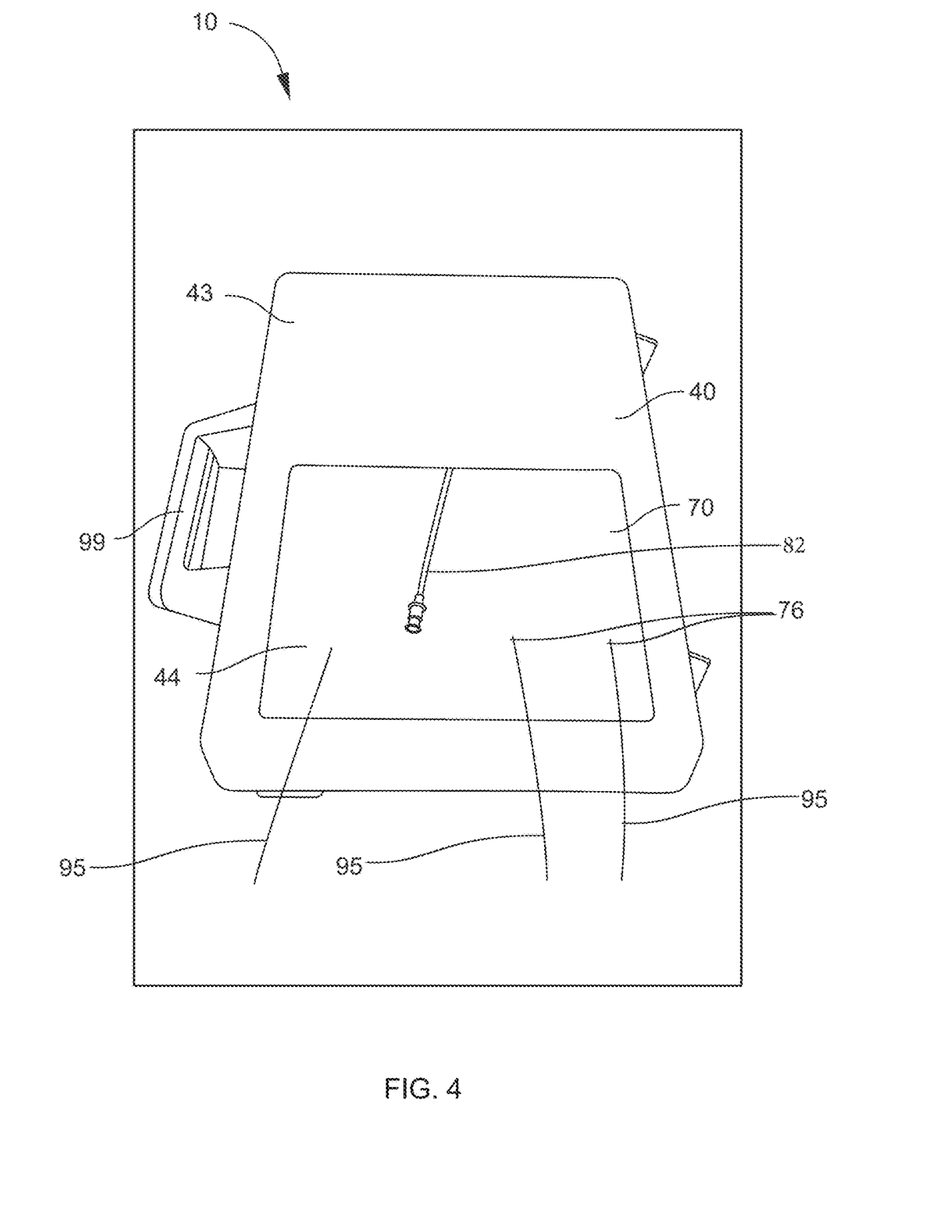
FIG. 4 is a perspective, top view of one embodiment of the instant invention.
Figure 5:
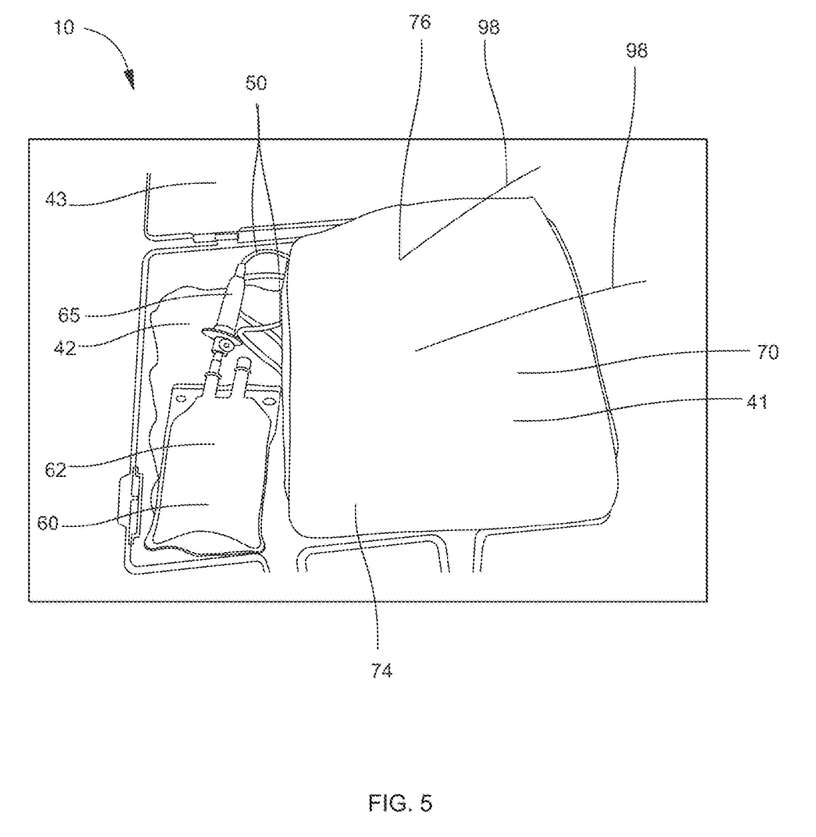
FIG. 5 is a perspective, top view of one embodiment of the instant invention.
Figure 6:
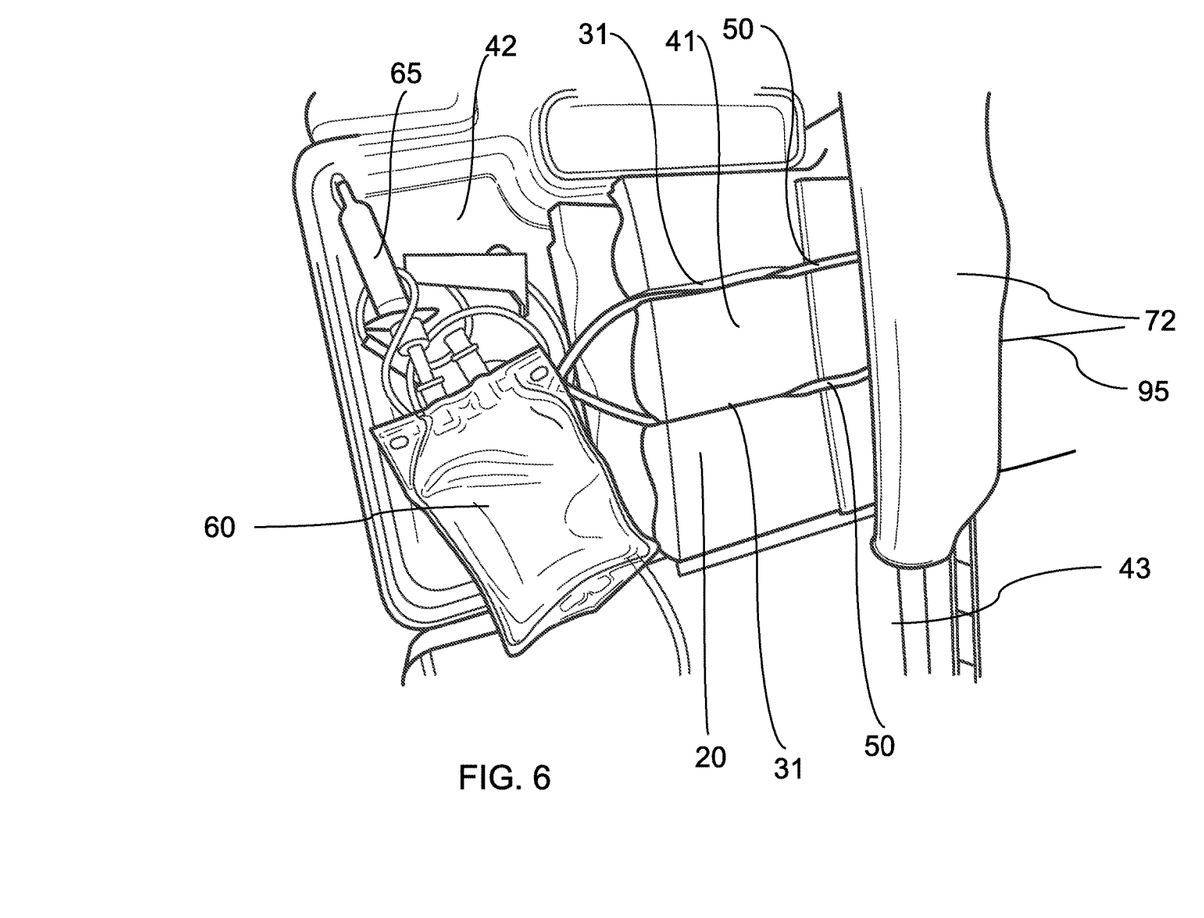
FIG. 6 is a top view of one embodiment of the instant invention.
Figure 7:
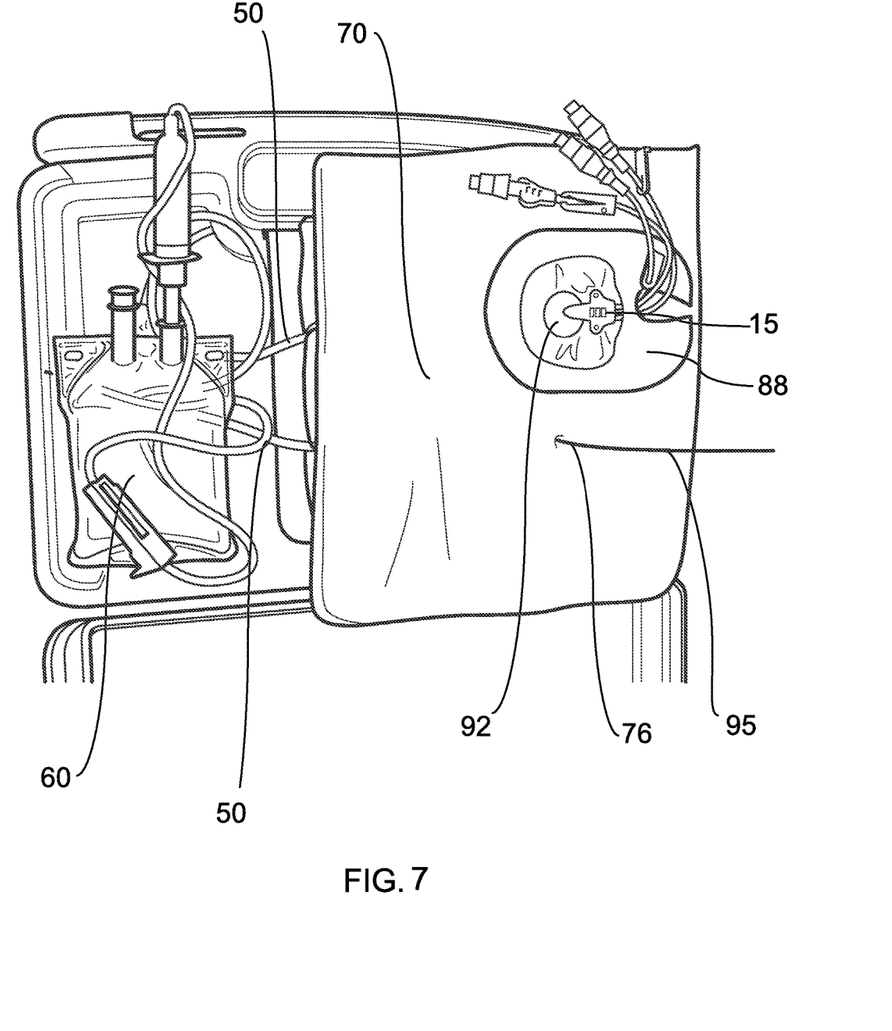
FIG. 7 is a top view of one embodiment of the instant invention.
Figure 8:
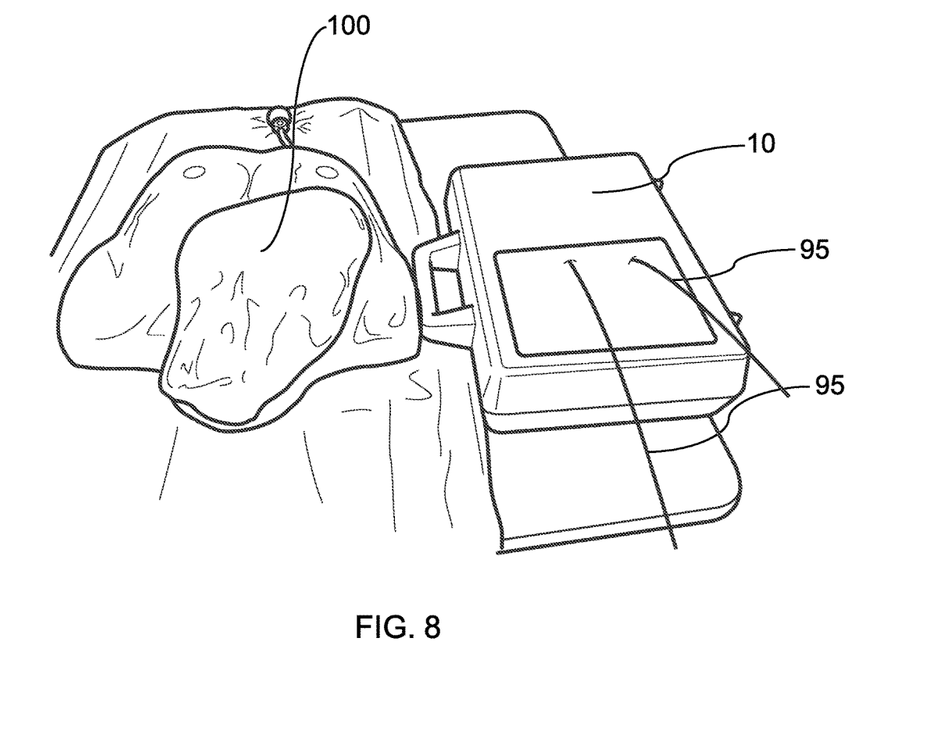
FIG. 8 is a perspective, top view of one embodiment of the instant invention in conjunction with a training mannequin.
Figure 9:
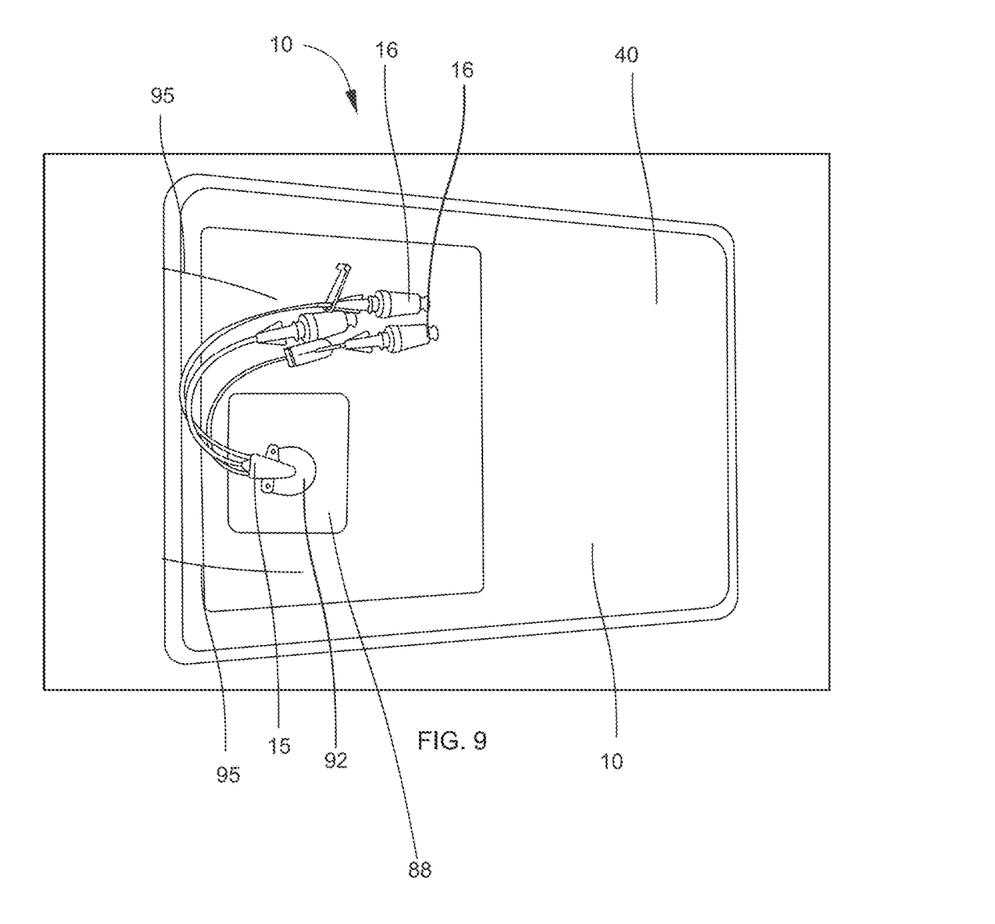
FIG. 9 is a top view of one embodiment of the instant invention.
Figure 10:
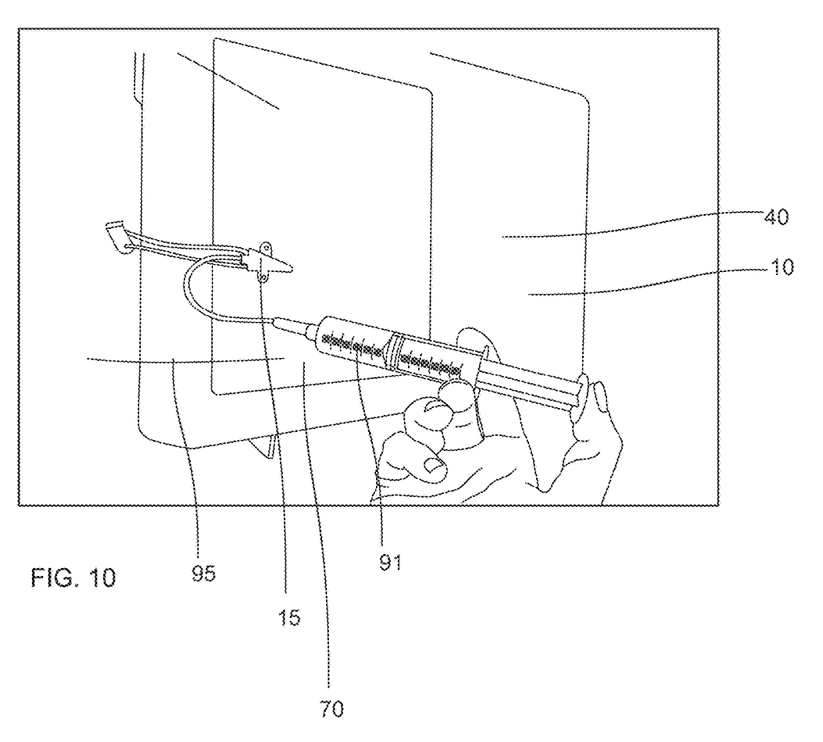
FIG. 10 is a perspective, top view of one embodiment of the instant invention.
Figure 11:
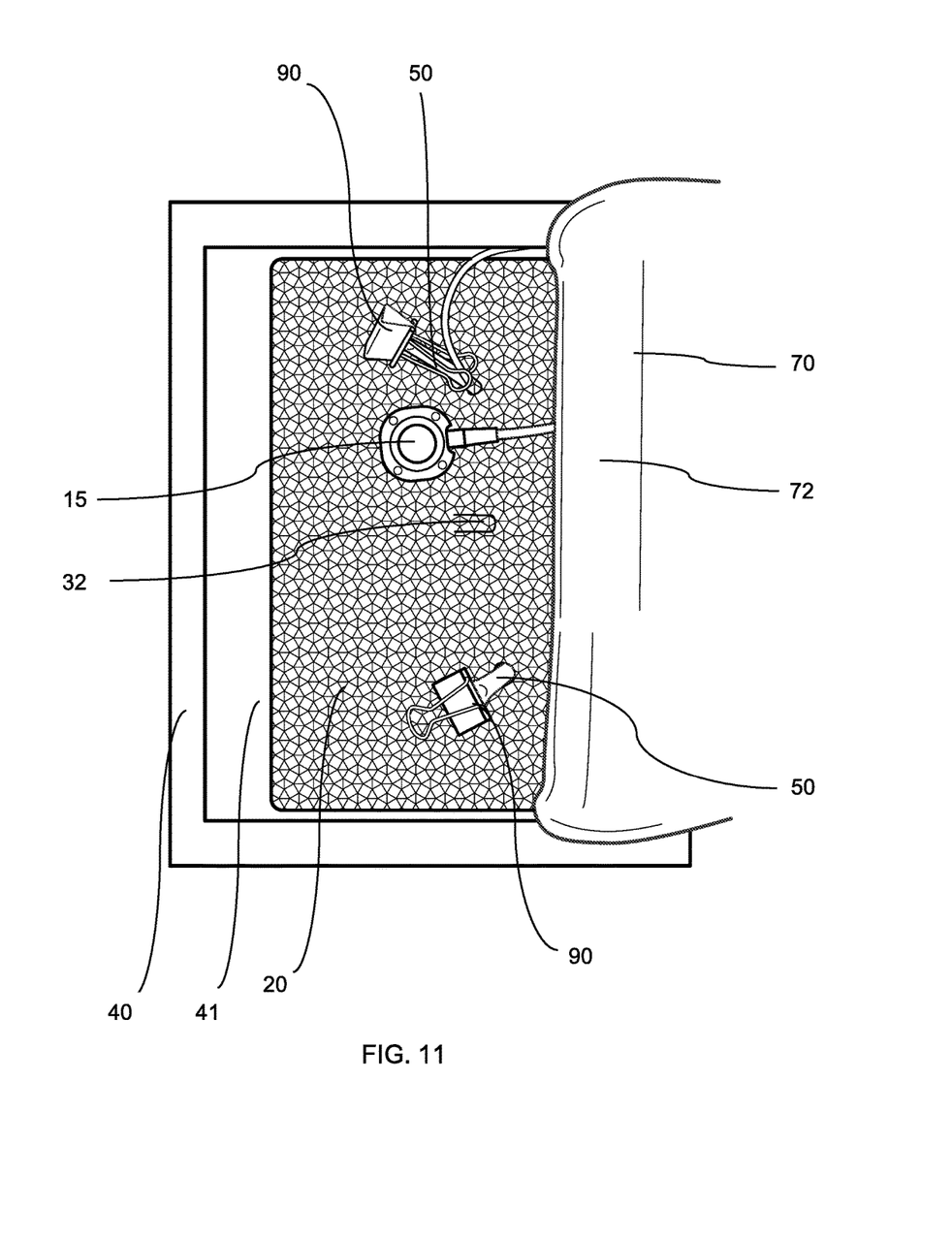
FIG. 11 is a top view of one embodiment of the instant invention.
Figure 12:
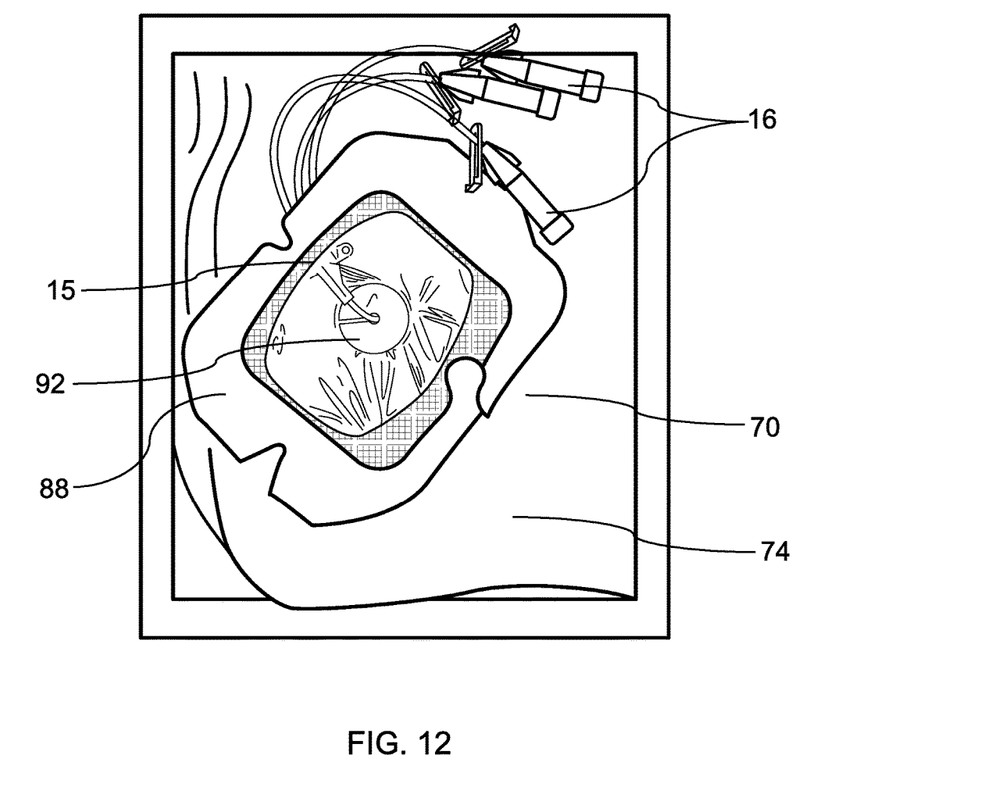
FIG. 12 is a top view of one embodiment of the instant invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The instant invention, referred to as the Central Venous Access Trainer (CVAT) 10 allows a healthcare provider to practice Central Venous Catheterization in a simulated environment as accurately and thoroughly as possible while being highly cognizant of expenses. Central Venous Catheter (CVC), also known as a central line, central venous line, or central venous access catheter, is a catheter placed into a large vein. Catheters can be placed in veins in the neck (internal jugular vein), chest (subclavian vein or axillary vein), groin (femoral vein), or through veins in the arms (also known as a PICC line, or peripherally inserted central catheters), It is used to administer medication or fluids that are unable to be taken by mouth or would harm a smaller peripheral vein, obtain blood tests (specifically the "central venous oxygen saturation"), and measure central venous pressure. Reasons for the use of central lines include long-term intravenous antibiotics, long-term parenteral nutrition, especially in chronically ill persons, long-term pain medications, chemotherapy, drugs that are prone to cause phlebitis in peripheral veins (caustic), (i.e. calcium chloride, chemotherapy, hypertonic saline, potassium chloride (KCl), amiodarone, vasopressors (for example, epinephrine, dopamine), plasmapheresis, peripheral blood stem cell collections, dialysis, frequent blood draws, frequent or persistent requirement for intravenous access, need for intravenous therapy when peripheral venous access is impossible (i.e. blood, medication, rehydration). Monitoring of the central venous pressure (CVP) in acutely ill people to quantify fluid balance is also accomplished.

Central venous catheters usually remain in place for a longer period than other venous access devices, especially when the reason for their use is longstanding (such as total parenteral nutrition in a chronically ill person). For such indications, a Hickman line, a PICC line, or a Port-a-Cath may be considered because of their smaller infection risk. Sterile technique is highly important here, as a line may serve as an entry point for pathogenic organisms. Additionally, the line itself may become infected with bacteria such as *Staphylococcus aureus* and coagulase-negative *Staphylococci*.

The trainer 10 described herein is a cost-effective way for the users to practice all of these steps of the procedure that has, until now, had numerous steps omitted due to the cost of supplies and the recommendations from the manufacturer of commercial trainers. For example, the manufacturers of some commercial trainers allow for the visualization, palpation and location of the simulated vein to be accomplished along with the insertion of a needle in order to locate a guide wire within the simulated vein. This, is unfortunately as far as the manufacturer recommends for training to proceed in order to avoid damage to the commercial trainer. Other manufacturers advertise that the entire CVC placement procedure can be performed on their central line trainers, but most have found that the steps of nicking the simulated skin with a scalpel, dilating the entry point, and inserting the central line dramatically decreases the lifespan of the commercial trainer and makes an already expensive trainer (costing between $750 and $2000) even more costly due to an increased tissue set replacement cycle (costing between $500 and $1000). However, omitting those steps lead to an obvious incomplete skill set for the learner, thus opening up the likely result of substandard care for a patient.

During development, the CVAT 10 was designed and developed as a new innovative approach to improve education while decreasing cost. It has been utilized for a variety of levels of learners and from multiple disciplines including physicians, physician assistants, and registered nurses. The CVAT 10 has also illustrated its value in the Nursing Home and Nursing care settings for Central Line care and dressing change as well as for Port-a-Cath care. We were able to place the Port-a-Cath under the skin and they used it just as they would for a central line.

Referring to the drawings, wherein like numerals, indicate like elements, there is shown in the Figures an embodiment of a training device 10 for the preparation, execution and maintenance of central venous catheters 15 comprising a central block 20 including a cavern 30 or channel 31 traversing through the block 20, wherein the cavern 30 has a proximal opening 32 and a distal opening 34, a tube 50 running through the cavern 30, the tube has a proximal end 52, a distal end 54 and a lumen 55 which facilitates fluid communication where the proximal end 52 of the tube is sealed. The embodiment also includes a reservoir 60 containing a liquid 62 with the distal end 54 of the tube 50 engaged with the reservoir 60 and in fluid communication with the liquid 62. A covering material 70 with an inner surface 72 and an outer surface 74 is secured over the central block 20 and a guidewire 95 with a proximal end 96 and a distal end 98 with the distal 98 end located within the lumen 55 tube 50 and the proximal end 96 extending through the covering material 70. The embodiment also includes a hydraulic or pneumatic device 65 is operationally associated with the reservoir 60 and allows the reservoir 60 and the tube 50 to be filled and pressurized with the liquid 62, a scalpel or similar instrument for making a small incision in the covering material 70 at the entry point 76 where the guide wire 95 extends through the covering material 70, a dilator 82 to feed over the guidewire 95 and into the incision entry point 76 in order to expand the incision opening and then remove from the incision and guidewire 95 and a catheter 15 to feed over the guidewire 95 and into the incision.

In one embodiment of the instant invention, the central block 20 is made of a polystyrene, a reticulated foam or equivalent material. In another embodiment, the polystyrene is selected from the group including, but not limited to, extruded polystyrene (EPS), extruded polystyrene (XPS) a bioplastic foam, or a combination thereof. In one embodiment of the instant invention, the covering material 70 is made from a material selected from the group including an elastomeric material, a silicone, a latex, a natural rubber, or a combination thereof. The replacement cost for the covering material 70 is between 2-10% of the cost for the replacement skin of a commercial trainer ($20-$50 as opposed to $450-$850).

The instant invention may further include saline to flush the catheter 15, suture materials 85 to suture the catheter 15 in place and a sterile dressing 88 to cover and protect the catheter 15. In one embodiment of the instant invention, the training device 10 is used in conjunction with an anatomical central line training manikin 100 where a portion of the training of one or more individuals is accomplished using each device. In another embodiment, the catheter 15 is selected from the group including: a peripherally inserted central catheter, a tunneled catheter, an implanted port (i.e. Port-a-Cath for use in chemotherapy), or a combination thereof.

Another embodiment of the instant invention discloses a training device 10 for the preparation, execution and maintenance of central venous catheters 15 comprising a case 40 with a lid 43 and an opening 44. The case 40 may have one or more compartments including a first compartment 41 and a second compartment 42. In one embodiment, the opening 44 permits access to the interior of the case including at least one compartment. The embodiment includes a central block 20 residing in the case 40, the block has two or more channels 31 traversing one or more surfaces of the block and a tube 50 running through each channel 31, where each tube has a proximal end 52, a distal end 54 and a lumen 55 which facilitates fluid communication where the proximal end 52 of each tube is sealed either permanently or through the use of a clamp 90. The embodiment also includes a reservoir 60 containing a liquid 62 with the distal end 54 of each tube 50 engaging with the reservoir 60 and in fluid communication with the liquid. A covering material 70 with an inner surface 72 and an outer surface 74 is secured over the central block 20 and the outer surface 74 is accessible through the case opening 44. A guidewire 95 is also included where the guide wire 95 has a proximal end 96 extending through the covering material 70 at the entry point 76 and a distal end 98 located within the lumen 55 each tube 50. A hydraulic or pneumatic device 65 is operationally associated with the reservoir 60 and allows the reservoir 60 and each tube 50 to be filled and pressurized with the liquid in order to simulate the vasculature of a living patient. The embodiment also includes a scalpel or similar instrument for making a small incision in the covering material 70 at the entry point 76 where each guide wire 95 extends through the covering material 70, a dilator 82 to feed over each guidewire 95 and into the incision 76 in order to expand each incision opening and then be removed from the incision and from the guidewire 95, and a catheter 15 to feed over each guidewire 95 and into the incision, after which the guide wire 95 is removed.

In the above embodiment, the central block 20 is made of a polystyrene, a reticulated foam or equivalent material. In another embodiment, the polystyrene is selected from the group including, but not limited to, extruded polystyrene (EPS), extruded polystyrene (XPS) a bioplastic foam, or a combination thereof. In one embodiment of the instant invention, the covering material 70 is made from a material selected from the group including an elastomeric material, a silicone, a latex, a natural rubber, or a combination thereof. The instant invention may further include saline to flush the catheter 15, suture materials 85 to suture the catheter 15 in place and a sterile dressing 88 to cover and protect the catheter 15. In one embodiment of the instant invention, the training device 10 is used in conjunction with an anatomical central line training manikin 100 where a portion of the training of one or more individuals is accomplished using each device. In another embodiment, the catheter 15 is selected from the group including: a peripherally inserted central catheter, a tunneled catheter, an implanted port (i.e. Port-a-Cath for use in chemotherapy), or a combination thereof.

The instant invention also includes a method of training a person in the preparation, execution and maintenance of a catheter 15 comprising the steps of:
  (a) providing an anatomical central line training manikin 100;
  (b) cleaning/sterilizing the area proximal to a vein/tube into which the CVC 15 will be inserted;
  (c) palpating the vein/tube within the training manikin 100;
  (d) inserting a syringe 91 and needle into the training manikin 100 and locating the vein/tube;
  (e) removing the syringe 91 from the needle;
  (f) inserting a guide wire 95 into the needle;
  (g) feeding the guide wire 95 into the vein/tube;
  (h) providing a training device 10 for the preparation, execution and maintenance of catheters 15 comprising:
    a case 40 with a lid 43 and an opening 44;
    central block 20 residing in the case 40, the block has two or more channels 31 traversing one or more surfaces of the block;
    a tube 50 running through each channel 31, where each tube has a proximal end 52, a distal end 54 and a lumen 55 which facilitates fluid communication where the proximal end 52 of each tube is sealed either permanently or through the use of a clamp 90;
    a reservoir 60 containing a liquid 62 with the distal end 54 of each tube 50 engaging with the reservoir 60 and in fluid communication with the liquid;
    a covering material 70 with an inner surface 72 and an outer surface 74 is secured over the central block 20 and the outer surface 74 is accessible through the case opening 44;
    a guidewire 95 is also included where the guide wire 95 has a proximal end 96 extending through the covering material 70 at the entry point 76 and a distal end 98 located within the lumen 55 each tube 50;
    a hydraulic or pneumatic device 65 is operationally associated with the reservoir 60 and allows the reservoir 60 and each tube 50 to be filled and pressurized with the liquid in order to simulate the vasculature of a living patient;
  (i) incising the covering material 70 with a scalpel or similar instrument at the entry point 76 where each guide wire 95 extends through the covering material 70;
  (j) feeding a dilator 82 over each guidewire 95 and into the entry point 76 in order to expand each entry point 76;
  (k) removing the dilator 82 from the entry point 76 and guidewire 95, leaving the guide wire 95 in place;
  (l) feeding a catheter 15 over each guidewire 95;
  (m) inserting the catheter into the incision until it is in its desired location;
  (n) removing the guidewire 95; and
  (o) flushing the catheter out with saline.

In one embodiment of the above method, the central block 20 is made of a polystyrene, a reticulated foam or equivalent material. The polystyrene is selected from the group consisting of: extruded polystyrene (EPS), extruded polystyrene (XPS) a bioplastic foam, or a combination thereof. In another embodiment, the covering material 70 is made from a material including an elastomeric material, a silicone, a latex, a natural rubber, or a combination thereof. In another embodiment, the catheter 15 is selected from the group including: a peripherally inserted central catheter, a tunneled catheter, an implanted port (i.e. Port-a-Cath for use in chemotherapy), or a combination thereof.

In one embodiment, the above method further includes the steps of:
(p) suturing the catheter 15 in place on the outer surface 74 of the covering material 70;
(q) placement of an antimicrobial material or device on the patient's skin around the catheter 15 and the entry point 76; and
(r) covering the catheter 15 with a sterile dressing 88 to protect the catheter 15.

In another embodiment, the above method(s) further includes the steps of:
(s) removing the sterile dressing 88 from the catheter 15;
(t) removing the antimicrobial material or device from the patient's skin and cleaning the patient's skin around the catheter 15 and entry point 76 into the patient;
(u) observing the patient's skin around the catheter 15 and entry point 76 and noting any signs of discoloration and/or infection;
(v) flushing the catheter 15 out with saline to ensure that the catheter is functioning properly;
(w) placement of a new antimicrobial material or device on the patient's skin around the catheter 15 and the entry point 76; and
(x) covering the catheter 15 with a sterile dressing 88 to protect the catheter.

In one embodiment, the above method includes the use of sonogram technology (including color Doppler duplex sonography) to aid in the placement of the catheter 15 during any of the steps described above. In any of the above embodiments, the case 40 may have one or more compartments including a first compartment 41 and a second compartment 42. The opening 44 permits access to the interior of the case including at least one compartment 41, 42 and the covering material 70.

Any method described herein may incorporate any design element contained within this application and any other document/application incorporated by reference herein. Any design element contained within this application may be incorporated into any embodiment contained within this application.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively discloses herein suitably may be practiced in the absence of any element which is not specifically disclosed herein.

We claim:

1. A training device for the preparation, execution and maintenance of central venous catheters comprising:
   a central block including a cavern or channel traversing through the block, wherein the cavern has a proximal opening and a distal opening;
   a tube running through the cavern, the tube has a proximal end, a distal end and a lumen which facilitates fluid communication where the proximal end of the tube is sealed;
   a reservoir containing a liquid with the distal end of the tube engaged with the reservoir and in fluid communication with the liquid;
   a covering material with an inner surface and an outer surface, where the covering material is secured over the central block;
   a guidewire with a proximal end and a distal end with the distal end located within the tube and the proximal end extending through the covering material;
   a hydraulic or pneumatic device is operationally associated with the reservoir and allows the reservoir and the tube to be filled and pressurized with the liquid;
   a scalpel configured to make an incision in the covering material at the site where the guide wire extends through the covering material;
   a dilator to feed over the guidewire and into the incision in order to expand the incision and then remove from the incision and guidewire; and
   a catheter to feed over the guidewire and into the incision.

2. The training device of claim 1 wherein the central block being made of a polystyrene or a reticulated foam.

3. The training device of claim 2 wherein the polystyrene is selected from the group consisting of: extruded polystyrene (EPS), extruded polystyrene (XPS) a bioplastic foam, or a combination thereof.

4. The training device of claim 1 wherein the covering material is made from a material including an elastomeric material, a silicone, a latex, a natural rubber, or a combination thereof.

5. The training device of claim 1 further including saline to flush the catheter, suture materials to suture the catheter in place and a sterile dressing to cover and protect the catheter.

6. A training device for the preparation, execution and maintenance of central venous catheters comprising:
   a case with a lid and an opening;
   a central block residing in the case, the block has two or more channels traversing one or more surfaces of the block;
   a tube running through each channel, each tube has a proximal end, a distal end and a lumen which facilitates fluid communication where the proximal end of each tube is sealed;
   a reservoir containing a liquid with the distal end of each tube engaging with the reservoir and in fluid communication with the liquid;
   a covering material with an inner surface and an outer surface, where the covering material is secured over the central block and the outer surface is accessible through the case opening;
   a guidewire with a proximal end and a distal end with the distal end located within each tube and the proximal end extending through the covering material;
   a hydraulic or pneumatic device operationally associated with the reservoir and allowing the reservoir and each tube to be filled and pressurized with the liquid;

a scalpel configured to make an incision in the covering material at the site where each guide wire extends through the covering material;

a dilator to feed over each guidewire and into the incision in order to expand each incision and then remove from the incision and guidewire; and a catheter to feed over each guidewire and into the incision.

7. The training device of claim 6 wherein the central block being made of a polystyrene or a reticulated foam.

8. The training device of claim 7 wherein the polystyrene is selected from the group consisting of: extruded polystyrene (EPS), extruded polystyrene (XPS) a bioplastic foam, or a combination thereof.

9. The training device of claim 6 wherein the covering material is made from a material including an elastomeric material, a silicone, a latex, a natural rubber, or a combination thereof.

10. The training device of claim 6 further including saline to flush the catheter, suture materials to suture the catheter in place and a sterile dressing to cover and protect the catheter.

11. A method of training a person in the preparation, execution and maintenance of a central venous catheter (CVC) comprising the steps of:

providing an anatomical central line training manikin;

cleaning/sterilizing the area proximal to a vein/tube into which the CVC will be inserted;

palpating the vein/tube within the training manikin;

inserting a syringe and needle into the training manikin and locating the vein/tube;

removing the syringe from the needle;

inserting a guide wire into the needle;

feeding the guide wire into the vein/tube;

providing a training device for the preparation, execution and maintenance of central venous catheters comprising:

a case with a lid and an opening;

a central block residing in the case, the block has two or more channels traversing one or more surfaces of the block;

a tube running through each channel, each tube has a proximal end, a distal end and a lumen which facilitates fluid communication where the proximal end of each tube is sealed;

a reservoir containing a liquid with the distal end of each tube engaging with the reservoir and in fluid communication with the liquid;

a covering material with an inner surface and an outer surface, where the covering material is secured over the central block and the outer surface is accessible through the case opening;

a guidewire with a proximal end and a distal end with the distal end located within each tube and the proximal end extending through the covering material;

a hydraulic or pneumatic device operationally associated with the reservoir and allowing the reservoir and each tube to be filled and pressurized with the liquid;

incising the covering material with a scalpel creating an incision at the site where each guide wire extends through the covering material;

feeding a dilator over each guidewire and into the incision in order to expand each incision removing the dilator from the incision and guidewire;

feeding a catheter over each guidewire;

inserting the catheter into the incision; removing the guidewire; and flushing the catheter out with saline.

12. The method of claim 11 wherein the central block being made of a polystyrene or a reticulated foam.

13. The method of claim 12 wherein the polystyrene is selected from the group consisting of: extruded polystyrene (EPS), extruded polystyrene (XPS) a bioplastic foam, or a combination thereof.

14. The method of claim 11 wherein the covering material is made from a material including an elastomeric material, a silicone, a latex, a natural rubber, or a combination thereof.

15. The method of claim 11 further including the steps of suturing the catheter in place on the outer surface of the covering material; placement of an antimicrobial material or device around the catheter and on the patient's skin; and covering the catheter with a sterile dressing to protect the catheter.

16. The method of claim 11 wherein the catheter is selected from the group including: a peripherally inserted central catheter, a tunneled catheter, an implanted port, or a combination thereof.

17. The method of claim 15 further including the steps of:

removing the sterile dressing from the catheter;

removing the antimicrobial material or device from the patient's skin and cleaning the patient's skin around the catheter entry point into the patient;

observing the patient's skin around the catheter entry point and noting any signs of discoloration and/or infection;

flushing the catheter out with saline to ensure that the catheter is functioning properly;

placement of an antimicrobial material or device around the catheter and on the patient's skin; and covering the catheter with a sterile dressing to protect the catheter.

* * * * *